April 4, 1950     P. VOGELSANG     2,502,809

METHOD OF TREATING SEED AND SEED PRODUCTS

Filed Feb. 24, 1944

INVENTOR.
Phelps Vogelsang

BY George B Willcox

ATTORNEY.

Patented Apr. 4, 1950

2,502,809

UNITED STATES PATENT OFFICE 2,502,809

METHOD OF TREATING SEED AND SEED PRODUCTS

Phelps Vogelsang, Midland, Mich., assignor, by mesne assignments, to Seed Pellets, Inc., Saginaw, Mich., a corporation of Michigan Application February 24, 1944, Serial No. 523,760

27 Claims. (Cl. 47—58)

This invention relates to the treatment of seeds and is particularly directed to a method of preparing seeds for planting, and to the product so obtained.

In efforts to reduce labor costs and economize on seed, many suggestions have been made with respect to the planting and cultivating of field crops by mechanical means. By the use of mechanical planters individual seeds are planted far enough apart so as to preclude the necessity for subsequent hand blocking and weeding, and to permit machine cross-cultivation throughout at least the first part of the growing season. While such planting and cultivating techniques have been widely accepted anad practiced in large-scale operations with corn and the like, a number of other field crops have not been adapted for such mode of operation either by reason of the poor germination qualities of available seed whereby it has been necessary to overplant and subsequently thin, or because of the physical form of the seed whereby it is not readily handled in and by existing planting devices.

Sugar beets are an outstanding example of a large acreage field crop the planting and cultivation of which embodies wasteful practices. The irregularly shaped beet seed clusters or balls tend to jam and pack in feeding devices so that mechanical planters cannot be used and antiquated practices of hand sowing and drilling must be employed. The resulting uneven stands of beet seedlings are thereafter thinned, blocked, and cultivated largely by hand, if a satisfactory yield is to be obtained from a given area of land.

Many attempts have been made to provide procedures for the sowing and spacing of beet seeds so as to permit mechanical cross-cultivation. However, the poor germinating qualities of field run beet seed and the grouping of the seed germs together in corky seed balls potentially adapted to produce a multiplicity of seedlings have greatly hindered such developments.

It has previously been suggested to treat seeds prior to planting with various pastes or adhesives so that the seed is embedded in a carrier. However, the products so obtained have not been particularly satisfactory in use. In the first place, pills produced according to such methods are not uniform in size or shape. Also, for use in mechanical planting devices a coated seed product must be sufficiently hard and tough as to be resistant to cracking and crushing on contact with the moving parts and surfaces of the planter. The same properties are essential in connection with handling, packaging, shipping, and storage. The coated seed heretofore known has not been characterized by these necessary properties.

A further disadvantage accruing to the coated seed products as described in the prior art has been the frequent failure of the coating to permit the ready passage of moisture after planting whereby unsatisfactory results have been obtained with respect to germination. These and other considerations such as the cost of treatment have operated to prevent the adoption of known seed coating methods on a commercial scale.

It is an object of the present invention to provide a method for treating seeds of small or irregular size to produce therefrom seed pellets of such magnitude, hardness, and uniformity of size as to be adapted for handling in mechanical planting devices without crushing of the pellet or jamming and plugging of the planter. A further object is to supply a process yielding a seed pellet product which on planting will have high germination and give seedlings resistant to the "damping-off" action of soil organisms. An additional object is the provision of a coating process for seeds which will be more economical than those previously suggested. A still further object is to provide a method for the treatment of beet seeds to obtain seed pellets adapted for handling in mechanical planting devices whereby the seeds may be so spaced in the soil as to make unnecessary manual blocking and thinning operations and permit of mechanical cross-cultivation of the resultant beet seedlings. An additional object is the provision of a spheroidal seed pellet resistant to crushing on handling, of uniform size and weight, and adapted, on contact with soil moisture, to crumble and break down readily so as to permit germination of the seed and emergence of the sprout. Other objects will become apparent from the following specification and claims.

In accordance with the present invention it has been discovered that seeds may be treated with aqueous methyl cellulose solutions and a suitable powder or dust material to coat the individual seeds and produce spherical or spheroidal seed pellets of uniform size, hardness, and germination characteristics. These seed pellets consist of a relatively uniform coating of impacted dust particles bound by adhesive methyl cellulose around and about the original seed particle as a nucleus. The pellets or pills are of such hardness as to be resistant to crushing during packaging, shipping, storage or planting operations, yet sufficiently porous and water-absorptive as to soften readily on contact with soil moisture to permit a higher than ordinary degree of germination and sprouting. The particular dust materials which have been found to give satisfactory results are fly-ash, feldspar, and acid-activated earth singly or in combination.

The comprehensiveness of these terms—fly ash, feldspar, and acid-activated earth—for the purposes of this description, will be explained further in the specification.

In carrying out the new process, a considerable quantity of the seed, after preliminary preparation if necessary, is placed in a rotating or revolving container or bowl having a continuous curved inner surface, preferably spherical and the individual seed bodies are rolled in contact with each other and the moving curved surfaces of the container. The rolling seed mass is then (1) sprayed with aqueous methyl cellulose solution in amount sufficient to moisten the seed surfaces, and thereafter (2) dusted with that amount of fly-ash, feldspar, or acid-activated earth which will adhere to the moistened seed surfaces. These steps of alternately spraying and dusting are repeated until a coating of the desired thickness has been deposited around the seed. Certain optional steps may be carried out at this point, as will be hereinafter more fully described, but my preferred application of the basic process of the invention indicates that the moist pellets be removed from the reactor and dried.

Among the optional steps which may precede the drying operation, is the placing of a finish coat upon the pellets before removal from the bowl or coating reactor. This may be accomplished by following the ultimate dusting operation with a relatively heavy application of methyl cellulose solution and thereafter rolling the pellets in contact with the air to permit the absorption and partial drying of the adhesive. This gives a harder, tougher exterior to the finished pellets. Alternatively, before drying the moist pellets they may be dusted with a powder of somewhat smaller particle size than would be satisfactory for use during the entire coating operation. Such finish coat renders the finished pellets less abrasive than would otherwise be the case.

A further step which may be followed prior to the drying operation is that of screening or otherwise sizing the moist pellets. While such sizing can be carried out as well following the drying operation, an advantage accruing to the classification of the moist product is that under-sized pellets may be returned to the reactor and given an additional coating.

The expression "fly-ash" as herein employed refers to the fine ash or flue dust as separated from the combustion products of industrial coal-burning furnaces and particularly units burning pulverized coal. Feldspar is a ground rock mineral (orthoclase) consisting chiefly of silicates of alumina with soda, potash, or lime. The expression "acid-activated earth" refers to mineral earths or clays that are stable because of absence of organic matter. Such earths are commonly used in decolorizing, bleaching, filtering, insulating, and in absorption and purification operations.

Methyl cellulose employed as an adhesive in accordance with the present invention is a polymethyl ether of cellulose, soluble in cold water, and relatively insoluble in hot water and saturated salt solutions. It is commercially available in the form of white fibres or granules, and in aqueous solution is colorless, odorless, tasteless and non-toxic. It is stable to alkalies and to dilute acids. This product is available in viscosity ratings ranging from 15 centipoises or lower to 4000 centipoises. Such ratings are based upon the absolute viscosity of 2 per cent by weight aqueous solutions of the various methyl cellulose products at 20° C.

Any suitable methyl cellulose solution may be employed in accordance with the present invention. By "suitable" is meant such a solution of methyl cellulose as small comprise the physical qualities of adhesiveness, viscosity and centipoise rating which are indicated by the following example:

Best results have been obtained by using aqueous solutions of a product having a rating of 25 centipoises or lower, and the preferred adhesive is a solution of a methyl cellulose of about 15 centipoise rating or lower. The percentage by weight of methyl cellulose employed in such aqueous solution varies with the centipoise rating of the methyl cellulose. With a product of the 15 centipoise type, from 5 to 10 per cent by weight and preferably about 8 per cent by weight is employed on the larger type seeds. The amount of such solution required to give a pellet of satisfactory hardness is dependent upon the amount of seed employed in the reaction batch, the size of pellet desired, the centipoise rating of the original methyl cellulose product, and the concentration of methyl cellulose in the solution. For smaller seeds, the same results can be attained by using methyl cellulose of higher centipoise rating, in lower concentrations.

The preferred coating materials have already been indicated as being fly-ash, feldspar, and acid-activated earth. Here again, the amounts of materials employed vary with the size of seed pellet desired. For the several dust or coating materials, certain critical limitations have been established on particle size. Thus it appears that products of medium fineness are required. If very coarse dust materials are used, the finished pellets will not be of sufficient hardness to withstand handling. If very fine dusts are employed, irregular bodies are obtained which do not have the uniformity of hardness and form required for mechanical planting operations. In general, the operable range in particle size for the several coating materials varies between about 80 and 250 screen mesh. For best results, feldspar should have an average particle size of 150 screen mesh, and fly-ash and acid-activated earth average particle sizes of 175 screen mesh.

In carrying out the invention, it is to be understood that the seeds and seed pills or pellets are to be subjected to a continuous rolling operation throughout the period required to spray and dust amounts of adhesive and powder necessary to build up a coating of the desired thickness. This rolling operation is to be distinguished from tumbling or shaking, neither of which is productive of a spheroidal pellet of uniform size and hardness. Also, it is desirable that a considerable batch of seeds be processed at one time in order that each individual seed or pellet may roll in contact with and under the pressure exerted by others. It is the combination of the rolling of the pellet in contact with the moving curved surface of the reactor and the continuous rolling contacts with the other moving pellets which causes the formation of the hard spheroidal bodies in accordance with the present invention.

For purpose of illustrating the typical product structure the accompanying drawings are presented, wherein—

Figure 1:
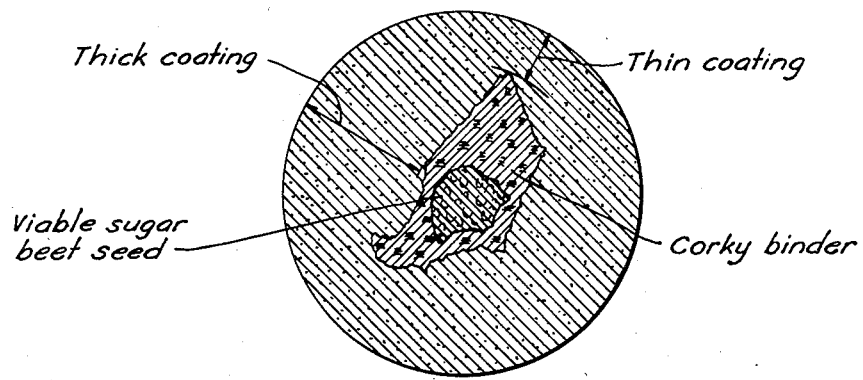
Fig. 1 is an enlarged sectional view showing schematically a preferred arrangement of the principal parts of a spherical pellet with a fractionated seed of sugar beet; also a typical spherical pellet coating surrounding the seed and a portion of the seed's corky shell or binder.

Any spherical or spheroidal reactor revolving or rotating so as to roll the seeds or pellets over continuously curving surfaces may be employed. The operable ranges for the rate of rotation of the reactor and the resultant rate of rolling of the pellets vary considerably. Thus a critical speed of operation exists for each individual reaction, and will vary with the size and form of the reactor. A further factor influencing the rate of rolling of the pellets is the depth of the seed or pellet batch being processed. Thus, with reactors of small circumference, somewhat faster rotation is practical than with larger reactors. However, when a sizable batch of seed is to be processed in a large reactor, the reactor may be rotated more rapidly than when a small amount of seed is concerned. Similarly as the bulk of the product in process increases through the gradual enlargement of the individual pellets, the rate of rotation of the reactor may advantageously be varied.

The preferred reactor consists of a spherical can equipped with a port for introduction of adhesive and dust, and revolved on an axis at an angle 70 to 80 degrees from the vertical. In this type of reactor, the seeds and partly finished pellets tend to move in a circular fashion throughout the body of the rolling mass. The smaller pellets work to the upper surface of the rolling body of the charge where they become enlarged in size through contact with the sprayed adhesive and dusted powder, and thereafter migrate to the interior of the rolling pellet mass and are replaced at the top by other undersized pellets.

The spraying of the methyl cellulose solution may be carried out with any suitable pressure apparatus. The exact type of spray nozzle or head, the size of the orifice therein, and the pressure required for propulsion of the adhesive through the orifice are largely dependent upon the viscosity of the adhesive solution and the fineness of the spray desired. When operating with a small quantity of seeds or pellets, a somewhat finer spray is desirable than in operation on a large scale. In practice a commercial paint sprayer has been found adequate in most instances.

The dusting operation may be carried out in any convenient manner but preferably by shaking the dust evenly over the rolling mass of moistened seed as through a sieve of suitable fineness. In small scale operation, the dust may simply be sprinkled over the moist seed or pellets in such a fashion as to approximate uniform distribution.

It is to be understood that the methyl cellulose solution and dust are contacted with the rolling seeds or seed pellets portionwise and alternately until a pellet of the desired size is obtained. Thus, the methyl cellulose solution is sprayed onto the rolling seed mass until the point is approached where the seeds or pellets tend to stick together or adhere in clumps. At this point spraying is stopped and dusting commenced and continued to the point where the pellets have a dry appearance, care being taken to avoid the addition of excesses of dust which do not adhere to the surfaces of the rolling bodies. Such spraying and dusting operations are repeated as may be desired.

The temperature of operation should be maintained below 40° C. which is the gelation temperature of aqueous methyl cellulose. The time required to accomplish the spraying and dusting varies with the particular apparatus employed, the size of the seed batch under treatment, and the size of the pellets it is desired to obtain.

In carrying out the drying step, care should be exercised that the temperature does not greatly exceed 30° C. Drying at higher temperatures tends to reduce the hardness of the pellets. Also, the germination of the seed pellets is adversely affected by operation at even sligthly elevated temperatures. A slow rate of drying results in pellets of maximum hardness.

While the present process presumes a source of seeds in form satisfactory for coating, in certain instances a preliminary treatment of the seed is desirable. With all seed, it is beneficial to screen out foreign matter and dirt. For regular, smooth surfaced seeds this screening is sufficient. With tomato, cotton, or other spiny or hairy seeds having a tendency to cling together to form loose aggregates, it is desirable to first coat the seeds with a finely-divided material such as feldspar, talc, fly-ash, etc., and to break the agglomerates apart before attempting the complete coating operation.

When it is desired to coat beet seed or other multiple germ seed, it is essential that the seed ball be broken down to liberate the individual seed bodies. This may be accomplished by tearing away or otherwise removing the corky binder as by running the seed through a scarifier. The scarified seed product may then be classified in such fashion that pieces of binder, seed fragments, and sterile seeds of lighter gravity are removed leaving only the heavier and viable seed segments to be coated in accordance with the present invention.

The coating of small and irregularly shaped seeds constitutes the preferred embodiment of the present invention. The new process is particularly applicable to the treatment of beet seeds. In such operation, sugar beet or garden beet seeds are passed through a scarifier or other device for breaking down the seed ball and liberating the single seed germ, and the resulting mixture screened and classified as set forth above. A generic description applicable to the coating of such prepared seed has already been given, and specific details for operation appear in certain of the subsequent examples.

While the process as heretofore described has been directed particularly to the coating of seed with dust and methyl cellulose adhesive, it is to be understood that many modifications of the invention are possible. Thus, various insecticidal, fungicidal, and disinfectant materials may be incorporated in the coating so as to protect the seedling upon emergence from attack by various soil organisms ordinarily causing "damping-off." Representative of the fungicidal and insecticidal materials which may be so employed are chloranil, sodium - 2.4.5 - trichloro - phenolate, 2.4.5-trichloro - phenol, calcium - 2.4.5.6 - tetrachloro-phenolate, sodium-pentachloro-phenolate, ortho-phenylphenol, para-phenylphenol, phenyl-mercury-acetate, ethyl-mercury-chloride, ferric-dimethyl-dithiocarbamate, ethyl-mercuric-phosphate, tetramethyl-thiuram-disulfide, tartar emetic, sulfur, copper oxide, etc. These materials may be applied directly on the seed, distributed throughout the coating by inclusion in either the dust or adhesive where compatible therewith, or segregated in either the outer or intermediate layers of the pellet if it be desired to prevent prolonged contact of the disinfectant with the seed proper.

In similar fashion, fertilizers and/or plant stimulants may be included in the seed coating substantially as described for the parasiticides. Other additaments adapted to be employed as constituents of the coating include plant growth control substances such as indole-butyric acid, alpha-naphthyl-acetic acid, dichlorophenoxy-propionic acid, naphthoxy-acetic acid, alpha-naphthyl acetamide, etc.; soil conditioners such as lime or sodium carbonate; inoculants such as bacterial cultures; and organic dyes or inorganic pigments designed primarily to impart color to the completed pellet.

The segmented and classified sugar beet seed employed in the operations described in certain of the following examples averaged 87 per cent germination in standard viability determinations. To determine the effect of the several treatments disclosed, the seed pellets symbolized in Fig. 1, as obtained were planted in fungi-infected soil and observations made on the maximum emergence of seedlings and the post emergence "damping-off" of seedlings in the 15 days following planting. In these emergence and "damping-off" determinations, a high humus soil was employed and the seed flats maintained under conditions of high humidity, low temperature, and minimum sunshine to encourage the attack of the seeds and seedlings by soil organisms. When the uncoated scarified seed was planted under these conditions, the maximum average emergence in 12 days was 58 per cent. Within 15 days of the time of planting, 62 per cent of the emerged seedlings had died by reason of the attack of "damping-off" organisms present in the soil.

The following examples illustrate the invention but are not to be construed as limiting.

EXAMPLE 1

A spherical reactor 16 inches in diameter and rotating on an axis at an angle of approximately 70° from the vertical was employed as a mixing and coating chamber. Throughout the operation this reactor was rotated at 16 revolutions per minute. 4 ounces of scarified sugar beet seed (14,750 seeds) was charged into the reactor and treated with 1.5 quarts of a 4 per cent by weight aqueous solution of 25 centipoise methyl cellulose (containing 0.12 pound of dry methyl cellulose) and 48 ounces of a high silicon, low carbon, fly-ash having an average particle size of 135 screen mesh and varying in particle size from about 125 to 250 screen mesh. This was accomplished by continuously rolling the seeds in the reactor and alternately moistening the rolling body of seeds with a very fine spray of the methyl cellulose solution, and dusting with the fly-ash. Up to the point where approximately one-third of the methyl cellulose solution and fly-ash had been added, the seeds presented a somewhat irregular appearance as regards form. Thereafter, however, the rolling and rubbing of the partially finished pellets in contact with each other and the moving surfaces of the reactor imparted to each particle an approximately spherical or spheroidal configuration. The alternate spraying and dusting steps were continued until all of the methyl cellulose solution and fly-ash had been added, with the temperature maintained at 20°–30° C. throughout.

The moist pellets were then removed from the reactor and screened to obtain a preponderance of pellets of 13/64 inch diameter. A few pellets of smaller diameter were returned to the reactor while still moist and given an additional coating. The oversized pellets were dried, broken apart, and both seed and coating utilized in a later operation. The pellets of 13/64 inch diameter were air-dried at 20°–25° C. for a period of 72 hours, and thereafter tested to determine their resistance to crushing according to an arbitrary test in which the individual pills were placed between plain surfaces and force exerted thereon. It was found that these pellets resisted several pounds pressure and were sufficiently hard and tough as to be adapted to be employed in mechanical planting devices and to be subjected to conventional packaging and handling operations without undue breakage. Softer pellets were not so adapted. This pellet was arbitrarily set up as a standard against which all subsequent products were compared.

The average maximum emergence of seedlings from these pellets when planted in fungi-infected soil was 94 per cent. The average loss of seedlings in 15 days from post emergence "damping-off" was 21 per cent.

The chemical cost of this treatment, with methyl cellulose at 40 cents per pound and fly-ash at 20 dollars a ton, runs to approximately one-half cent per 1000 seed pellets.

EXAMPLE 2

In a similar fashion the apparatus as described in Example 1 was employed for the coating of 4 ounces of sugar beet seed with 1.5 quarts of an 8 per cent aqueous solution of 15 centipoise methyl cellulose (containing 0.24 pound of dry methyl cellulose) and 48 ounces of fly-ash. There was obtained from this operation 13/64 inch diameter seed pellets which, when dried, had a hardness twice that of the standard pellet described in Example 1. These pellets were tough and more resistant to cracking and crushing than those of Example 1, yet broke down quickly on contact with moisture so as to permit of an average seedling emergence of between 90 and 95 per cent. The post emergence "damping-off" in 15 days average 21 per cent.

The chemical cost of producing pellets according to the method of this example was 0.85 cent per thousand.

EXAMPLE 3

An operation analogous to that described in Example 1 was carried out by treating 4 ounces of sugar beet seed with 0.5 quart of 8 per cent aqueous 15 centipoise methyl cellulose (containing 0.08 pound of dry methyl cellulose) and 58 ounces of finely-ground feldspar varying a particle size from 125 to 250 screen mesh and averaging 150 screen mesh. The resulting pellets were classified as described in Example 1 and those of 13/64 inch diameter dried. These pellets had a hardness of 2.3 times that of the standard pellets of Example 1. The average maximum emergence of seedlings from these pellets from infected soil was 81 per cent, and the loss of emerged seedlings in 15 days due to post emergence "damping-off" was 25 per cent.

The chemical cost of coating 1000 pills according to this method was less than one-half cent, with feldspar at 20 dollars a ton.

EXAMPLE 4

A similar determination was carried out in which a spherical reactor 4 feet in diameter was employed for the coating of 8 pounds of sugar beet seed with a total of 2.25 gallons of 8 per cent aqueous 15 centipoise methyl cellulose solution (containing 1.44 pounds of dry methyl cellulose) and 102.7 pounds of the finely-ground feldspar. In this operation, the reactor was run at 13–16 revolutions per minute until approximately two-thirds of the coating materials had been alternately applied portionwise to the seed charge. The rate of rotation was then reduced to 9 revolutions per minute during the addition of the balance of the coating materials. The temperature of operation was about 20°–25° C. throughout.

After classification of the seed pellets for size, those having a diameter of 13/64 inch were dried in the usual fashion and found to have a hardness three times that of the standard pellet. This product was found to have very desirable properties as regards germination, emergence, and resistance to crushing or shattering on handling, packing, and planting.

EXAMPLE 5

The reactor and procedure as described in Example 1 was repeated with 4 ounces of sugar beet seed, 1 quart of 8 per cent aqueous 15 centipoise methyl cellulose solution, and 48 ounces of acid-activated earth (commercially available as filtrol) having a particle size of from 125 to 250 screen mesh and averaging 150 screen mesh. The product from this operation consisted principally of seed pellets of 13/64 inch diameter, and having a hardness of twice that of the standard pellet. The average maximum emergence of seedlings from these pellets in infected soil was 70 per cent with a 20 per cent loss from post emergence "damping-off" in 15 days.

The chemical cost of coating 1000 seeds according to this procedure was approximately 1.1 cents, with acid-activated earth costing 40 dollars per ton.

EXAMPLE 6

One-half pint of Marosu tomato seeds were charged into the reactor as described in Example 1, and moistened with a fine spray of 8 per cent by weight aqueous solution of 15 centipoise methyl cellulose. The seeds were then dusted with fly-ash, and the clumps broken apart. The alternate spraying and dusting treatments were then continued in the usual fashion with continuous rolling until a total of 1.5 quarts of the methyl cellulose solution and 58 ounces of fly-ash had been employed. The seed pellets were then removed from the reactor and classified to obtain a product of 13/64 inch diameter. After three days drying in the air and at 20°–25° C., the pellets were found to have a hardness 2.7 times that of the standard pellet of Example 1. These pellets were planted in fungi-infected, high humus soil, and gave 100 per cent emergence in 13 days with no loss from post emergence "damping-off" in 15 days.

EXAMPLE 7

4.6 ounces of onion seed (containing 32,140 seeds) was subjected to treatment in the reactor as employed in Example 1 with 1 quart of 8 per cent aqueous 15 centipoise methyl cellulose solution and 56 ounces of feldspar. The resulting seed pellets were 11/64 inch diameter and, after the conventional drying operation, had a hardness of 1.6 times that of the standard pellet of Example 1.

The chemical cost of treating 1000 seeds in accordance with this procedure was 0.2 cent.

EXAMPLE 8

Various additaments may be worked into the coating of the seeds without material alteration of the procedures as hereinbefore given. The following items set forth representative charges of seed and other materials going into the formation of seed pellets of 13/64 inch diameter, and containing growth materials, fungicides, and the like, variously positioned in the coating.

Item A 4 ounces sugar beet seeds
0.4 ounce calcium hydrogen phosphate (150 screen mesh or under)
1.5 quarts 8 per cent aqueous 15 centipoise methyl cellulose solution
48 ounces fly-ash The calcium hydrogen phosphate in finely-divided form was dusted on the seed as a pre-coat in the rotating reactor as described in Example 1. The methyl cellulose solution and fly-ash were thereafter applied alternately and with rolling of the seed as heretofore described to obtain pellets having a hardness 1.3 times that of the standard pellet after three days drying. These pellets, when planted, gave an emergence of 100 per cent in 8 days as compared to an emergence for scarified seed of 60 per cent in 8 days.

Item B 4 ounces sugar beet seed
0.06 ounce of chloranil (325 screen mesh)
1.5 quarts 8 per cent aqueous 15 centipoise methyl cellulose solution
48 ounces acid-activated earth The chloranil was dusted directly on the seed by rolling in the reactor of Example 1 and the seed thereafter coated with the acid-activated earth and methyl cellulose solution in the conventional manner.

Item C 4 ounces sugar beet seed
0.02 ounce sodium-2.4.5-trichloro-phenolate
0.5 quart 8 per cent aqueous 15 centipoise methyl cellulose solution
58 ounces feldspar In this operation the seed was rolled in the reactor of Example 1 and treated in the usual way with the methyl cellulose solution and feldspar until about one-third of the coating had been applied. The sodium-2.4.5-trichlorophenolate was then intimately mixed with about 20 ounces of the remaining feldspar and this mixture alternately applied along with the required amounts of the methyl cellulose solution to increase the size of the pellets. A final or seal coat was then applied consisting of the remaining third of the methyl cellulose solution and feldspar.

Item D 4 ounces sugar beet seed
1.5 quarts of 8 per cent aqueous 15 centipoise methyl cellulose solution
48 ounces fly-ash
0.2 ounce red copper oxide The sugar beet seed was rolled and treated in the conventional manner until two-thirds of the methyl cellulose solution and fly-ash had been used. The copper oxide was thereafter intimately mixed with the remaining fly-ash and coating continued therewith to completion. The resulting pellets had a satisfactory hardness, and on planting in infected soil showed an emergence of 100 per cent within 8 days and a loss from post emergence "damping-off" of only 2 per cent in 15 days.

Sugar and starch used either as finely-divided solids or in aqueous solution as adhesives were found not to be satisfactory for use in the coating of seeds. Sugar and sugar solutions give a brittle coating which shatters on impact and is not conducive to the development of a healthy seedling from the coated seed. When starch is present, the coating is too soft to withstand handling. Also starch coatings tend to shrink and crack on drying.

Figure 2:
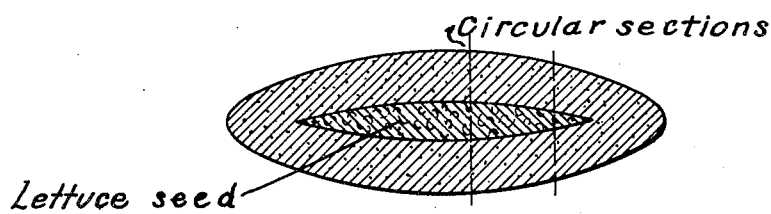
Fig. 2 is a similar view of a spheroidal pellet containing a lettuce seed and indicating by broken transverse lines the locations of various cross sections that are circular.

Other seeds which may be coated substantially as described in the foregoing examples are alfalfa, lettuce, symbolized in Fig. 2, carrots, radishes, celery, cotton, parsnip, turnip, rutabaga, clover, red beets, mangels, buckwheat, spruce, larch, poppy, etc.

To further set forth my invention and explain its principle so as to distinguish it from other inventions, I shall now append the following analysis of the characteristics of the solids and fluids required in practicing my invention, and the manner and the purposes of their use:

Analysis of the use and characteristics of the solids required in applicant's invention:

The kind of solids employed by me are set forth in the specifications and claims. They are finely divided and of a group of which fly-ash, activated earth, feldspar, are typical examples as regards their physical properties. Each item of this typical group has certain important qualities for the purposes of this invention. They are non-swelling upon wetting, and non-shrinking on drying.

Each of these materials must have relatively high specific gravity. Its particles must have appropriate shape to meet the special requirements of its use in my process.

Each material must be stable and non-toxic; that is, it must be mineral as distinguished from the organic substances heretofore used for coating seeds to prepare them for mechanical planters.

The particle shape of each of the typical materials used by me is always constant for a given material regardless of the fineness or coarseness to which it is reduced.

The particle sizes to be selected for any given case are determined by the circumstances of their use, such as the relationship between the mass in a given volume of material and the interstices in that same volume. The reasons for these several characteristics will now be stated, keeping in mind that starting with a seed of any size or shape, or a piece of fractionated seed, it is essential for the purposes of this invention that there shall be developed by this process a pellet which is of substantially spherical or spheroidal shape, smooth on the outside, and substantially of a predetermined net weight when completed.

Accuracy of the spherical shape is a factor in attaining crush-resistant properties and hardness of the finished product.

At this point, in connection with hardness, it may be noted that one of the features of producing hardness is the pressure exerted on the pellet while it is being fabricated. One of the ways of securing hardness has been to press a mass of seeds and binder material to make tablets for planting. But in many cases that operation injured the viability of the seed because of excess pressure.

In my present pelleting method the objections of tableting by presses are eliminated. I am enabled to vary the pressure exerted on the pellets during their formation by simply increasing the depth of charge in the bowl, without any danger of harming the viability of the seed by too much pressure.

However, in my process the pelleted product is formed under gravity pressure of the material itself, so applied as to produce a sufficiently hard pellet, and the viability of the seed is not harmed by that kind of compression.

Size of the individual particles in the solid ingredient, or in a combination of two or more solid ingredients, is another factor that controls hardness and crush-resistant qualities. Size of the particles also has to do with control of the moisture-absorbing qualities of the finished pellets.

One of the stated objects of my invention is to provide controls for the moisture absorbing qualities, in order to obtain unusually good seed germination and development, as will be explained further.

Referring to the specified properties of my pellets, non-swelling and non-shrinking, it is clear that no diatomaceous earth, clay, starch, or starch solution, lime, wood ashes, talc, or wood flour, can be used with success, as has been attempted heretofore, for the reason that such materials will not produce an even, accurately spherical product.

Furthermore, pellets made of such non-mineral substances break easily after they have been dried. They will crack and so become irregular and unsatisfactory for machine planting.

A practical reason for earlier undesirable performances has been that seeds are usually not spherical, but have many irregular shapes, yet the finished pellets must be spherical, spheroidal, or so nearly so as to meet modern requirements for planting machines.

With an irregular shaped seed the depth of coating in different places around a true sphere will be different. When such a pellet dries it shrinks irregularly, more in one place than another, because of the irregular shape of the seed. The pellet will tend to crack at the places where the coating is thinnest. This comes about from the fact that the coating material itself in earlier pellets would shrink more in the thicker portions than in the thinner portions.

In my process finely divided materials are used that will not shrink. The particles do not swell or shrink upon wetting or drying, as occurs with the organic substances above alluded to. The particles will not dissolve in use.

Each of the preferred materials, fly-ash, acid activated earth, and feldspar, in my process is different from the others in respect to the shape of the finely divided particles of which it is composed.

My invention takes advantage of the characteristic particle shapes of the solid materials to absolutely control the passage of moisture from the soil through the pellet coating material to the seed, as will now be explained. To speed up absorption of moisture by the pellet, a material with larger particles, or irregular geometrically shaped particles, is employed, and to retard the rate of moisture absorption the finer sizes or more regularly shaped particles are employed.

For instance, employing a number of inert material substances of different particle shapes, such as fly ash, feldspar, and activated earth, gives a choice of particle shape characteristics, and the use of those different shapes under different circumstances of seed quality enables me to pick out from such a list of materials that combination which will give the best permeability for proper seed germination. In practice that is determined experimentally by the user to suit his conditions. The key to my system of permeability control is that different shaped inert particle ingredients can be used singly or used in proportions appropriate to impart different degrees of permeability to the completed coating. For instance, fly ash particles are characterized by having deeply fissured surfaces. Consequently, the greater the proportion of fly ash in a given mix the greater will be the proportion of interstices filled with dry but water-soluble methecel, and the greater will be the permeability of the finished coating.

Conversely, the less fly ash used in proportion to the other inert ingredients, the less will be the proportion of water soluble methecel in the finished coating aggregate; giving a coating of less permeability.

The reason for the foregoing operation is that pelleting should not delay unduly the germination of the pelleted seed that is planted in normal or relatively dry soil. The composition of the completed pellet coating should be such that the per cent of moisture required to be present in the coating in order to soften it should be less than the per cent of moisture required to be present in the seed to induce its germination.

It is believed that the above described advantageous mode, whereby the permeability of the coating on a seed pellet can be predetermined and controlled by proper selection of solid particle ingredients according to their shape, is new in the pelleting art.

That selection of the solid material gives definite reliable efficient control of permeability and moisture absorption which prior to my invention was unknown in the art, so far as I am aware.

It should be noted here that the solid materials now under discussion are not fertilizers or insecticides and do not function as such.

The use of mineral solids instead of organic materials for building up pellets is, according to my invention, important for the further reason that mineral materials are stable in pellets of this kind and will not deteriorate or set up chemical reactions that disintegrate the pellets or that have toxic reaction on the seeds.

In practice it has been found that seeds pelleted with mineral solids retain their viability over longer periods of storage than they do when pelleted in any other way known to me.

As an instance from actual practice, onion seeds are notorious for their loss of viability, exhibited by a loss of 87 per cent in germinating properties in four years of ordinary seed storage. The same seeds pelleted with fly-ash, acid-activated earth, or feldspar, or alternate layers of these, exhibited a loss of only 18 per cent in germination after four years under identical storage conditions.

Reference has been made to the importance of proper specific gravity for the mineral coating material. Specific gravity of individual particles is one of the critical factors in the method of building up spherical pellets of uniform size by free rolling. They should be of uniform weight also.

This will be apparent when it is considered that very light substances, such as powdered cork, powdered mica, lime, starch, wood ashes and the like when rolled as described in my process, freely one upon the other, in a batch of appropriate size, do not have proper rolling contact with their neighboring pellets to produce uniform spherical shape; because they lack weight sufficient to give the desired formative effect.

*Specific advantages possessed by methyl cellulose as an adhesive for solids and seeds in making strong but readily soluble spherical pellets with smooth hard outer surfaces*

Methyl cellulose is stable as to heat, fungi, and bacteria. It will not spoil nor disintegrate after long time in storage. A pellet made with methyl cellulose in accordance with my method is as good after four years of warehouse storage as when first made. Its use in pellet manufacture is a new and advantageous process step, so far as I am aware.

Methyl cellulose dissolves readily in water taken from the soil. I have found it to possess tensile strength which I use to produce unusually hard and crush-resistant pellets and it holds the solid finely divided materials more firmly than any glue, sugar solution, syrup, starch, or organic substances, some of which have good adhesive qualities when new, but deteriorate rapidly. Methyl cellulose is much cheaper than most of the previously used adhesives for sticking solids to seeds, even in the ordinary coating processes that involve merely mixing the seeds with adhesive, or the pellet processes wherein a heavy coating is applied to the seeds by adhesives in order to give volume to the pellets.

Methyl cellulose is not a colloidal material. It is a suspension of solids in a liquid. Thereby it distinguishes fundamentally from the various colloidal materials specified in those of the references that relate to the problem of making pelleted seeds that shall possess specified physical features and properties.

I claim:

1. A method of preparing seeds for planting which includes the steps of placing the seeds in a container and causing the seeds to roll one upon the other in various directions and under pressure exerted by others; alternately (a) spraying an aqueous methyl cellulose solution on the seeds in amount sufficient to moisten the surfaces thereof and (b) dusting the moist rolling seed with a finely-divided mineral solid which is insoluble, non-swelling and non-shrinking by application of moisture, in amount which will adhere to the moistened seed surfaces, until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

2. A method of preparing seeds for planting which includes the steps of placing the seeds in a container and causing the seeds to roll one upon the other in various directions and under pressure exerted by others; alternately (a) spraying an aqueous solution of methyl cellulose of centipoise rating not above 25 on the seeds in amount sufficient to moisten the surfaces thereof, and (b) dusting the moist rolling seed with that amount of a finely-divided solid of the group consisting of fly-ash, acid-activated earth, and feldspar which will adhere to the moistened seed surfaces until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

3. A method of preparing seeds for planting which includes the steps of placing the seeds in a container and causing the seeds to roll one upon the other in various directions and under pressure exerted by others; alternately (a) spraying an aqueous solution of 15 centipoise methyl cellulose on the seeds in amount sufficient to moisten the surfaces thereof, and (b) dusting the moist rolling seed with that amount of a finely-divided solid of the group consisting of fly-ash, acid-activated earth, and feldspar which will adhere to the moistened seed surfaces until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

4. A method of preparing seeds for planting which includes the steps of placing the seeds in a container and causing the seeds to roll one upon the other in various directions and under pressure exerted by others; alternately (a) spraying a 5-10 per cent by weight aqueous solution of 15 centipoise methyl cellulose on the seeds in amount sufficient to moisten the surfaces thereof, and (b) dusting the moist rolling seed with that amount of a finely-divided solid of the group consisting of fly-ash, acid-activated earth, and feldspar which will adhere to the moistened seed surfaces until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

5. A method of preparing seeds for planting which includes the steps of placing the seeds in a container having a continuous curved inner surface, rotating the container to cause rolling of the seeds while alternately (a) spraying an aqueous solution of methyl cellulose of centipoise rating below 25 on the seeds in amount sufficient to moisten the surfaces thereof, and (b) dusting the moist rolling seed with that amount of finely-divided fly-ash which will adhere to the moistened seed surfaces, until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

6. A method of preparing seeds for planting which includes the steps of placing the seeds in a container having a continuous curved inner surface, rotating the container to cause rolling of the seeds while alternately (a) spraying an aqueous solution of methyl cellulose of centipoise rating below 25 on the seeds in amount sufficient to moisten the surfaces thereof, and (b) dusting the moist rolling seed with that amount of finely-divided feldspar which will adhere to the moistened seed surfaces, until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

7. A method of preparing seeds for planting which includes the steps of placing the seeds in a container having a continuous curved inner surface, rotating the container to cause rolling of the seeds while alternately (a) spraying an aqueous solution of methyl cellulose of centipose rating below 25 on the seeds in amount sufficient to moisten the surfaces thereof, and (b) dusting the moist rolling seed with that amount of finely-divided acid-activated earth which will adhere to the moistened seed surfaces, until a coating of the desired thickness has been built up around each individual seed, and thereafter drying the coated seeds to obtain spheroidal seed pellets of such hardness as not to be readily crushed in mechanical planting devices and which, upon contact with soil moisture, soften and permit germination of the seed.

8. A spheroidal pellet containing a seed nucleus surrounded by a coating including impacted particles of a finely-divided inert mineral solid bound together by methyl cellulose, said coating characterized by being (a) of such hardness as to be resistant to crushing, and (b) of such absorptiveness as to soften readily on contact with soil moisture to permit germination and sprouting.

9. A spheroidal pellet containing a seed nucleus surrounded by a coating including impacted particles of a finely-divided mineral solid bound together by methyl cellulose of less than 25 centipoise rating, and characterized by being (a) of such hardness as to be resistant to crushing, and (b) of such absorptiveness as to soften readily on contact with soil moisture to permit germination and sprouting.

10. A spheroidal pellet containing a seed nucleus surrounded by a coating including impacted particles of a finely-divided inert solid bound together by 15 centipose methyl cellulose and characterized by being (a) of such hardness as to be resistant to crushing, and (b) of such absorptiveness as to soften readily on contact with soil moisture to permit germination and sprouting.

11. A spheroidal pellet containing a seed nucleus surrounded by a coating including impacted particles of finely-divided feldspar bound together by methyl cellulose of centipoise rating not greater than 25 and characterized by being (a) of such hardness as to be resistant to crushing, and (b) of such absorptiveness as to soften readily on contact with soil moisture to permit germination and sprouting.

12. A spheroidal pellet containing a seed nucleus surrounded by a coating including impacted particles of finely-divided fly-ash bound together by methyl cellulose of centipoise rating not greater than 25 and characterized by being (a) of such hardness as to be resistant to crushing, and (b) of such absorptiveness as to soften readily on contact with soil moisture to permit germination and sprouting.

13. A spheroidal pellet containing a seed nucleus surrounded by a coating including impacted particles of finely-divided acid-activated earth bound together by methyl cellulose of centipoise rating not greater than 25 and characterized by being (a) of such hardness as to be resistant to crushing, and (b) of such absorptiveness as to soften readily on contact with soil moisture to permit germination and sprouting.

14. A spheroidal pellet containing a seed nucleus surrounded by a coating including a fungicide, impacted particles of a finely-divided mineral solid bound together by methyl cellulose of centipoise rating not greater than 25 and characterized by being (a) of such hardness as to be resistant to crushing, and (b) of such absorptiveness as to soften readily on contact with soil moisture to permit germination and sprouting.

15. A spheroidal pellet containing a sugar beet seed nucleus surrounded by a coating including impacted particles of a finely-divided impermeable mineral solid bound together by methyl cellulose and characterized by being (a) of such hardness as to be resistant to crushing, and (b) of such absorptiveness as to soften readily on contact with soil moisture to permit germination and sprouting.

16. Improvement in that method of preparing seeds for use in mechanical planters which includes rolling the seeds in contact one with another while alternately (a) moistening them with adhesive fluid and (b) dusting the moist surfaces with dry finely divided solid material until a coating of desired thickness has been built up around each seed; said improvement comprising utilizing as the adhesive, aqueous solution of an inert non-toxic polymethyl ether of cellulose characterized by a concentration of substantially 5 to 10 per cent by weight, with a viscosity rating of not over 25 centipoises; and utilizing as the said solid material a mineral substance characterized by being stable to alkalies and dilute acids; and as regards particle size, being substantially within the operable range between 125 and 250 screen mesh.

17. Improvement in that method of preparing seeds for use in mechanical planters which includes rolling the seeds in contact one with another while alternately (a) moistening them with adhesive fluid and (b) dusting the moist surfaces with dry finely divided solid material and alternately moistening and dusting until a coating of desired thickness has been built up around each seed; said improvement comprising utilizing as the adhesive, an aqueous solution of methyl cellulose characterized by having concentration of substantially 8 per cent by weight, with a viscosity rating of substantially 15 centipoises; and utilizing as the said solid material a mineral substance which is stable to alkalies and dilute acids; and as regards particle size, is substantially 150 screen mesh.

18. In a method as set forth in claim 16, the combination of a final step to provide an exceptionally hard tough exterior to the finished product, such step comprising (c) applying a relatively heavy coating of methyl cellulose solution following the ultimate dusting operation, and thereafter rolling the pellets in contact with air to permit absorption and partial drying of the said heavy coating.

19. In the method as set forth in claim 16, the combination of the final steps comprising applying a coating of methyl cellulose following the ultimate dusting operation; dusting the pellets thus prepared with divided solids of a smaller particle size than would be satisfactory for use during the entire coating operation; thereby rendering the completed pellets less abrasive than otherwise would be the case.

20. A spheroidal pellet containing a seed nucleus surrounded by a coating including impacted mineral solid particles of medium fineness, namely, in the order of between 80 and 250 screen mesh, bound together by methyl cellulose aqueous solution that has been dried in contact with said solid particles, said pellet characterized by being (a) of such uniform hardness throughout its coating as to be resistant to crushing under conditions of handling in mechanical planters and (b) of such absorptiveness as to soften with less moisture per cent content than is required by the nucleus for its germination.

21. A seed pellet as claimed in claim 20 wherein the said aqueous methyl cellulose binder solution is of substantially 15 centipoise rating, at most; there being in such solution from 5 to 10 per cent by weight of methyl cellulose, according to the conditions of its use.

22. The method of preparing seeds for planting as claimed in claim 1, wherein the said alternate spraying and dusting operations are performed at a temperature below the gelation temperature of the said aqueous methyl cellulose solution used in the said spraying operations.

23. The method claimed in claim 1 wherein the said drying operations are performed at a temperature substantially 30° C.; for the production of pellets having maximum hardness and having absorptive characteristics appropriate for maximum viability over long periods of storage.

24. In a seed pellet of the kind wherein a viable seed is encased in a coating which consists of a body of material particles impregnated by a solidified water soluble fluid binder; said coating comprising principally a mass of impacted mineral material particles the interstices of which are filled with a solidified water soluble binder.

25. A seed pellet having a coating structure as set forth in claim 24 wherein the mass of particles consists of two or more admixed materials having different particle shapes, whereby the volume of interstices in said mass can be changed by proportioning the admix as desired, for the purpose of holding more or less solidified water soluble binder in the interstices.

26. In a seed pellet of the kind wherein a viable seed is encased in a coating which consists of a body of material particles impregnated by a solidified water soluble fluid binder; said coating comprising principally a mass of impacted mineral material particles the interstices of which are filled with methyl cellulose.

27. A seed pellet having a coating structure as set forth in claim 26 wherein the mass of particles consists of two or more admixed materials having different particle shapes, whereby the volume of interstices in said mass can be changed by proportioning the admix as desired, for the purpose of holding more or less methyl cellulose in the interstices.

PHELPS VOGELSANG.

(References on following page)

REFERENCES CITED

The following references are of record in the file of this patent:

UNITED STATES PATENTS

| Number | Name | Date |
|---|---|---|
| 56,140 | Blessing | July 3, 1866 |
| 82,503 | Eckhardt | Sept. 29, 1868 |
| 122,757 | Claussen | Jan. 16, 1872 |
| 312,041 | Upjohn | Feb. 10, 1885 |
| 1,319,157 | Lingle | Oct. 21, 1919 |
| 2,017,090 | Eggert | Oct. 15, 1935 |
| 2,168,332 | Fischer | Aug. 8, 1939 |
| 2,313,057 | Fischer | Mar. 9, 1943 |
| 2,339,335 | Heckmanns | Jan. 18, 1944 |

FOREIGN PATENTS

| Number | Country | Date |
|---|---|---|
| 506,731 | Germany | Sept. 8, 1930 |
| 508,520 | Germany | Sept. 27, 1930 |
| 11,758 | Great Britain | 1847 |